(12) United States Patent  
Sanchez et al.

(10) Patent No.: US 7,953,218 B2
(45) Date of Patent: May 31, 2011

(54) SYSTEM AND METHOD FOR ENHANCED ORIGINATION SERVICES FOR TOLL FREE TELEPHONE CALLS

(75) Inventors: Enrique Francisco Sanchez, Westlake Village, CA (US); Nathan Omar Dominguez, Westlake Village, CA (US)

(73) Assignee: Intermetro Communications, Inc., Simi Valley, CA (US)

( * ) Notice: Subject to any disclaimer, the term of this patent is extended or adjusted under 35 U.S.C. 154(b) by 1007 days.

(21) Appl. No.: 11/823,254

(22) Filed: Jun. 27, 2007

(65) Prior Publication Data
US 2007/0253547 A1 Nov. 1, 2007

Related U.S. Application Data

(62) Division of application No. 10/420,673, filed on Apr. 21, 2003, now Pat. No. 7,242,759.

(60) Provisional application No. 60/374,628, filed on Apr. 22, 2002.

(51) Int. Cl.
*H04M 7/00* (2006.01)
(52) U.S. Cl. ............... 379/219; 379/220.01; 379/221.12
(58) Field of Classification Search ................... 379/219, 379/220.01, 221.09, 221.12, 221.02
See application file for complete search history.

(56) References Cited

U.S. PATENT DOCUMENTS

| | | | |
|---|---|---|---|
| 6,035,028 A | 3/2000 | Ward et al. | 379/201 |
| 6,055,232 A | 4/2000 | Ward et al. | 370/385 |
| 6,285,749 B1 | 9/2001 | Manto | 379/114 |
| 6,442,169 B1 | 8/2002 | Lewis | 370/401 |
| 6,584,178 B2 | 6/2003 | Crockett et al. | 379/67 |
| 6,584,183 B2 | 6/2003 | Manto | 379/114 |

*Primary Examiner* — Creighton Smith

(57) ABSTRACT

Enhanced Origination Services (EOS) for Toll Free (TF) telephone calls consists of uploading instructions to the SMS/800 National Database, which instructions are subsequently downloaded by Signal Control Points (SCPs) in the United States for the routing of TF telephone calls. When a caller dials a TF number, a communication switching device queries the SCP serving the caller's LATA and routes the call according to the EOS instructions for that TF number. EOS instructions route the call to a POTS number in the originating LATA using an IntraLATA Carrier Identification Code. The POTS number is connected to a private gateway, which utilizes the Dialed Number Identification Service (DNIS) of the POTS number to perform a translation function, which may replace the received DNIS with the DNIS of the originally dialed TF number. The call is routed over the private network using the private network owner's database for routing instructions for the specific TF number. The call is routed through a dedicated connection to a facilities-based carrier or called party or through a switched connection to an egress SSP or local CO.

2 Claims, 3 Drawing Sheets

EOS SYSTEM

SYSTEM AND METHOD FOR ENHANCED ORIGINATION SERVICES FOR TOLL FREE TELEPHONE CALLS

CROSS-REFERENCE TO RELATED APPLICATIONS

Applicant(s) and/or Inventor(s) hereby rescind any disclaimer and/or any arguments made in any prior related application. Such disclaimer(s) and/or argument(s) as well as any prior art relevant to such disclaimer(s) and/or argument(s) may need to be revisited by the Examiner.

This patent application is a divisional of U.S. patent application Ser. No. 10/420,673 filed Apr. 21, 2003 now U.S. Pat. No. 7,242,759 entitled System And Method For Enhanced Origination Services For Toll Free Telephone Calls which application is incorporated herein by this reference thereto.

This patent application is related to and claims priority from U.S. Provisional Patent Application Ser. No. 60/374,628 filed Apr. 22, 2002 which application is incorporated herein by this reference thereto.

COPYRIGHT AUTHORIZATION

Portions of the disclosure of this patent document may contain material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever. 37 C.F.R. §1.71(d).

BACKGROUND OF THE INVENTION

1. Field of the Invention

The present invention relates generally to the origination and routing of toll free telephony calls.

2. Description of the Related Art

Signaling systems with a telephone network transfer control information, Including toll free calling information, to various elements of the telephone network, such elements to include the Customer Premises Equipment ("CPE"), Central Office ("CO") Access Tandem ("AT"), telephone switches, and gateways. Historically, information was sent through the same circuit that contained the voice traffic. A number of years ago, many telephone companies moved to out-of-band signaling, separating the control signal circuits from the voice traffic circuits that the voice traffic travels on. This separation of signaling from voice circuits is known as a Common Channel Signaling ("CCS") system. CCS systems include the Channel Interoffice Signaling ("CCIS") system, based on the Consultative Committee on International Telegraphy and Telephony ("CCITT") Signaling System 6 ("SS6"), and the International Telecommunications Union ("ITU-T") Signaling System 7 ("SS7"). In 1984, ITU-T introduced the specification for Integrated Services Digital Network ("ISDN"), a virtual CCS protocol in which the common signaling channel shares the same physical wire as the voice traffic but is contained in a separate virtual circuit.

Historically, when a subscriber dials a toll free number, the signaling system associated with the switch of the subscriber's Local Exchange Carrier ("LEC") queries a national database of toll free numbers. Based on the information returned, which includes the code for the Inter-Exchange Carrier ("IXC") designated to receive the telephony traffic, also known as a carrier identification code or CIC code, the LEC routes the telephony traffic to the proper IXC. The toll free telephony traffic then travels over legacy telephone circuits, often at substantial cost to the toll free number owner. The toll free number owner, typically the called party, is billed for the toll free call.

The Telecommunications Act of 1996 (the "Act"), which amended the Communications Act of 1934, was intended to promote competition and deregulation within the telecommunications industry. The Act made possible a set of competitive LECs ("CLEC") to compete against the incumbent LECs ("ILEC") prior to the Act. Many of the ILECs were the result of the Department of Justice-ordered divestiture of AT&T into seven regional telephone companies. The Act required ILECS to offer facilities, including switches, access lines and trunks, to CLECs at cost-based rates. The Act also required ILECs to offer telecommunications services to CLECs at wholesale rates. With the present invention, companies competing with ILECs or IXCs can offer toll free service at rates competitive to ILECs or IXCs. The invention, in turn, benefits telephone subscribers by keeping the price of toll free telephone calls competitive In legacy toll free network architectures, a long distance carrier that wishes to carry telephone traffic for certain toll free numbers must provision a circuit to the ILEC's Central Office ("CO") and/or Access Tandem ("AT") from which the toll free call originates. Traditionally, such provisioning is costly. The current invention reduces provisioning costs by having a toll free telephony call routed to a CLEC, where provisioning an interconnection to a long distance carrier is more cost effective.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
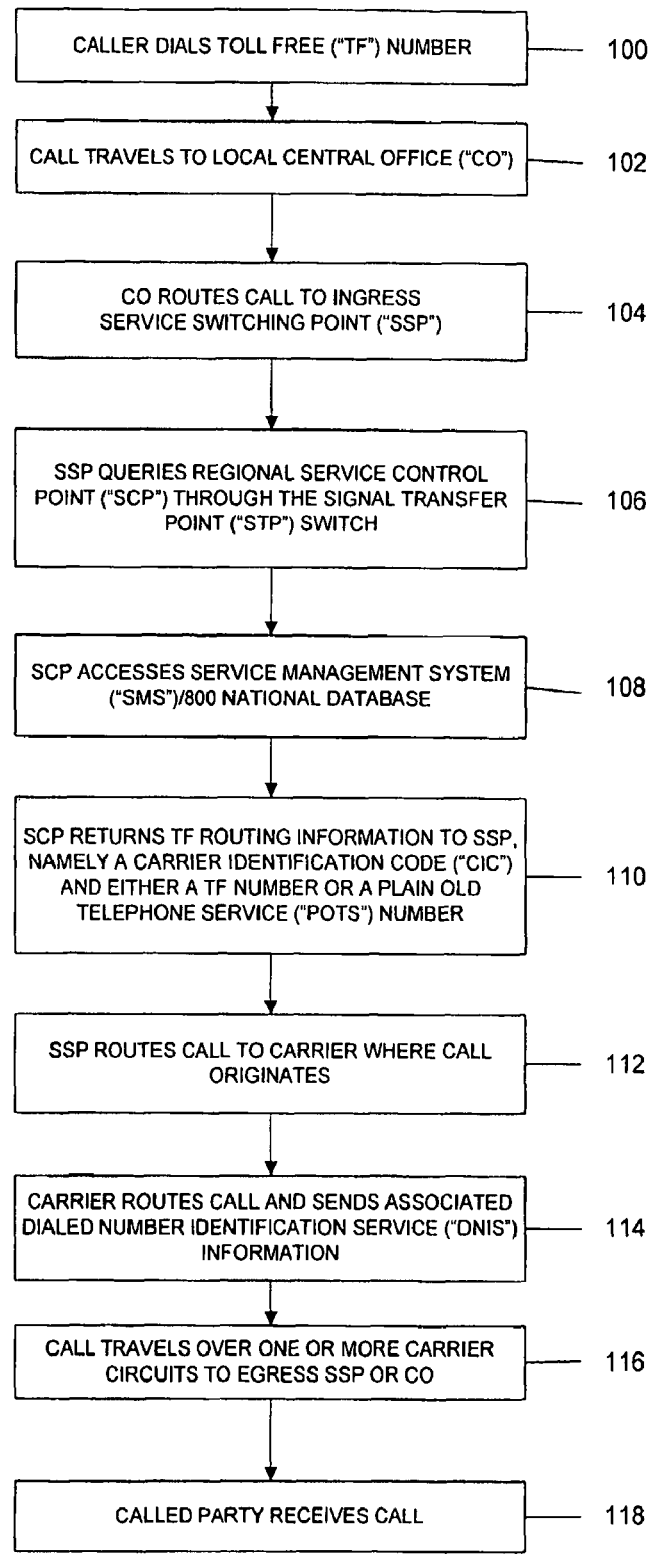
FIG. 1 shows a block flow diagram of the prior art method of toll free telephone service.

Referring to the drawings, where like numerals of reference designate like elements throughout, it will be noted that FIG. 1 shows a block flow diagram of the prior art method of toll free telephone service. Toll free telephone service allows callers to dial a telephone number without being charged for the call. The toll free call is billed to the receiver of the call. A non-geographic Numbering Plan Area ("NPA") code is used that indicates that a called party will be charged for a call rather than the calling party being charged. In the United States, toll free calls are currently preceded by a 1-800, 1-855, 1-866, 1-877, or 1-888 exchange. Other toll free prefixes may be added in the future. Toll free telephone service is referred to as "Freephone."

Referring now to FIG. 1, a caller dials a Toll Free ("TF") number from the caller's originating telephony device 100, which may be a desk telephone, cellular telephone, satellite telephone, etc. The toll free telephony call travels to a local telephone switch, the local Central Office ("CO") 102, also referred to as the End Office. The CO may be owned and/or operated by an Incumbent Local Exchange Carrier ("ILEC") or Competitive Local Exchange Carrier ("CLEC"). An ILEC is a telephone carrier/service provider that was operating a local telephone system prior to the divestiture of the AT&T Bell System. A CLEC is a telephone service company that provides local telephone service that competes with the ILEC. The CO routes the call to an ingress Service Switching Point ("SSP") 104. An SSP, in an Intelligent Network, is a stored-program controlled switching system that has the functional capability to differentiate Intelligent Network calls and interact with Service Control Points ("SCP"). An Intelligent Network is a telecommunications network architecture that has the ability to process call control and related functions via distributed network transfer points and control centers. An SCP is an on-line computer database that stores and processes information for completing calls in an Intelligent Network. An SSP contacts an SCP when the SSP recognizes a need for special call handling. SCP databases are accessed by the SSP in providing database query oriented services such as the toll free 800 database service and alternate billing services (e.g., calling-card, collect, and third-number-billed calls whose originating party does not pay for the call).

The SSP queries the regional SCP through a Signal Transfer Point ("STP") switch 106. An STP switch is a signaling switch used in the Signaling System 7 ("SS7") Common Channel Signaling ("CCS") network. SS7 is an international standard network signaling protocol that allows common channel (independent) signaling between telephone network elements. These transfer points are used to route signaling messages (packets) to other signaling transfer points or network parts. SS7 system protocols are optimized for telephone system control connections and they are only directly accessible to telephone network operators.

CCS is a separate signaling system that separates content of telephone calls from the information used to set up the call (signaling information). When call-processing information is separated from the communication channel, it is called "out-of-band" signaling. This signaling method uses one of the channels on a multi-channel network for the control, accounting, and management of traffic on all of the channels of the network.

An SS7 network is composed of SSPs, STPs, and SCPs. The SSP gathers the analog signaling information from the local line in the network (end point) and converts the signaling information into an SS7 message. These messages are transferred into the SS7 network to STPs that transfer the packet closer to its destination. When special processing of the message is required (such as rerouting a call to a call forwarding number), the STP routes the message to a SCP. The SCP is a database that can use the incoming message to determine other numbers and features that are associated with this particular call. In the SS7 protocol, an address, such as customer-dialed digits, does not contain explicit information to enable routing in a signaling network. Routing requires the Signaling Connection Control Part ("SSCP") translation function. This is a process in the SS7 system that uses routing tables to convert an address (usually a telephone number) into the actual destination address (forwarding telephone number) or into the address of an SCP (database) that contains the customer data needed to process a call. Intelligence in the network can be distributed to databases and information processing points throughout the network because the network uses CCS. A set of service development tools has been developed to allow companies to offer Advanced Intelligent Network ("AIN") services.

The SCP accesses a national toll free database, the Service Management System ("SMS")/800 National Database 108. SMS is a computer system that administers service between service developers and SCP databases in the SS7 network. SMS supports the development of intelligent database services. The system contains routing instructions and other call processing information. The SMS/800 National Database is maintained by the 800Number Administration and Service Center ("NASC"), currently located in St. Louis, Mo. The NASC is a communication center that allows toll free service providers to access an administrative computer system that provides toll free database services.

The SCP returns the TF routing information to the SSP 110. The routing information includes a carrier code identifier, a Carrier Identification Code ("CIC"). A CIC is a three digit Access Customer Name Abbreviation ("ACNA"), which is a three digit alpha code that is assigned to a carrier for use in the provisioning and billing of services through an access network, plus a four digit number code (e.g., ATX-0288). The routing information also includes either a TF destination telephone number or a local telephone number, also known as a Plain Old Telephone Service ("POTS") telephone number. POTS is basic telephone service without any enhanced features. It the common term for residential telephone service. The POTS system uses in-band signaling tones and currents to determine call status.

The SSP routes the call to the carrier covering the area of service, namely the local call region, from where the call originates via Feature Group D ("FGD") trunks 112. FGD provides trunk-side access to exchange carrier end-office switching systems and tandems. For an interexchange carrier, FGD offers call supervision, a uniform access code, optional calling party identification, recording of access charge billing details, and pre-subscription to a customer-specified interexchange carrier. The CIC identifies the carrier that will transport the call.

The specified carrier routes the call and sends associated Dialed Number Identification Service ("DNIS") information 114, which is typically the dialed TF telephone number, inside a telephony call header. The call travels over one or more carrier circuits to the egress SSP or the local CO 116. The called party receives the telephone call 118 on the recipient telephony device, such as a desk telephone or cell phone.

Figure 2:
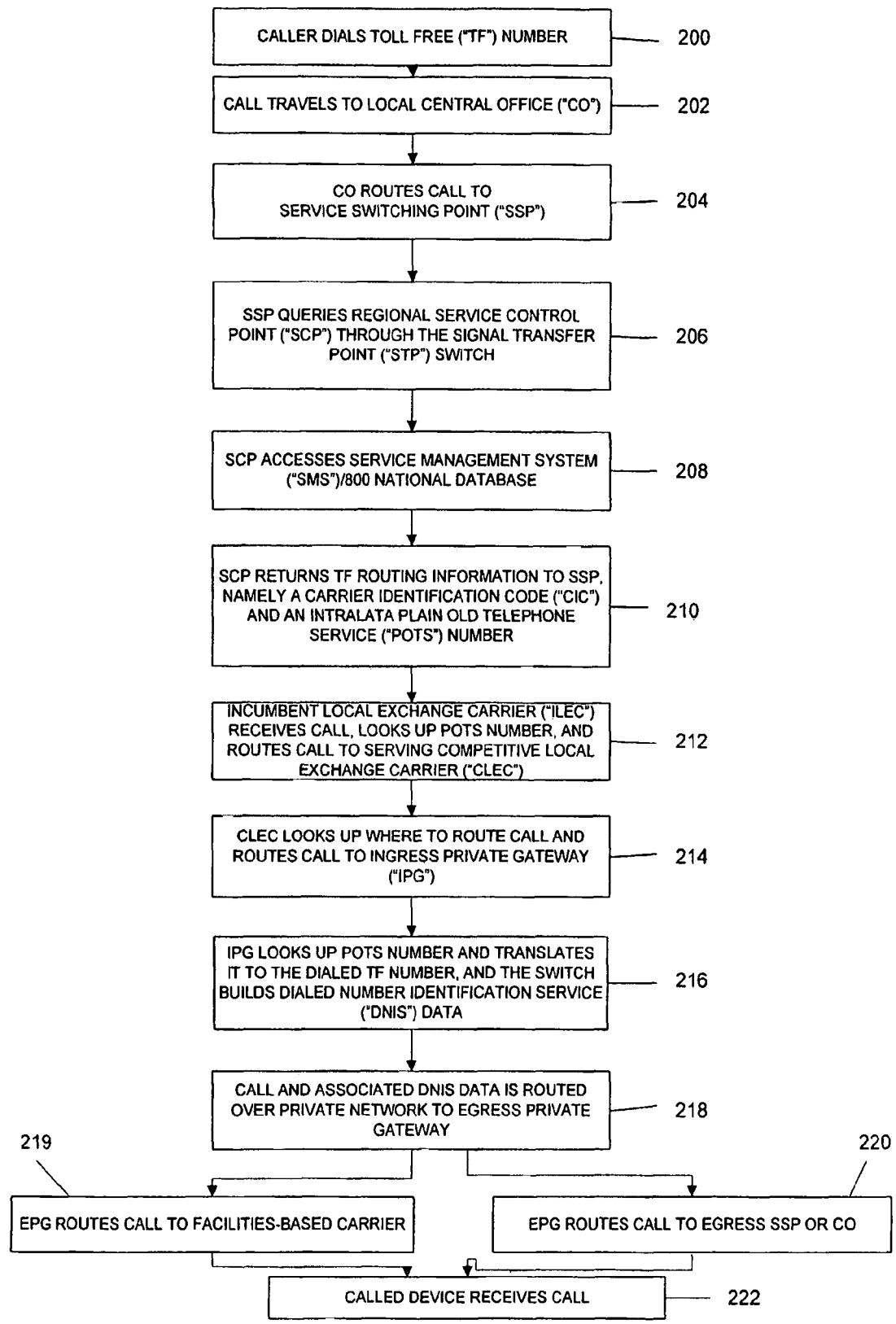
FIG. 2 shows a block flow diagram of the method of the enhanced origination services for toll free telephone service of the present invention.

FIG. 2 shows a block flow diagram of the method of the enhanced origination services for toll free telephone calls of the present invention. A caller dials a Toll Free ("TF") number from the caller's originating telephony device 200, which may be a desk telephone, cellular telephone, satellite telephone, etc. The call travels to the local telephone switch, a local CO 202, also referred to as the End Office. The CO routes the call to an ingress SSP 204. The ingress SSP queries the regional SCP through a Signal Transfer Point ("STP") switch 206.

The SCP accesses a national toll free database, the SMS/800 National Database 208. The SCP returns the TF routing information to the ingress SSP 210. The routing information includes a carrier code identifier, in this embodiment a CIC code, and an IntraLATA POTS telephone number, which is the local telephone number of an ingress gateway to a private network. "IntraLATA" refers to services that originate and terminate within the same LATA. "LATA" stands for Local Access Transport Area. In the preferred embodiment of this invention, the CIC code is a generic code for "tandem access for database query." This differs from prior art, where the CIC identifies a particular carrier.

The IntraLATA POTS telephone number was previously supplied by the private network provider to the SMS/800 National Database ("SMS Database") at the time the private network provider implemented its routing instructions for the related TF number to the SMS Database. The private network provider can access the SMS Database via either dedicated or switched connection. The private network provider needs to pre-populate the SMS database such that in each local calling region, namely in each local market or LATA, the SMS Database contains a local POTS number, which is the IntraLATA telephone number of the provider's local ingress private gateway to provider's private network. A local calling region can be identified in a number of ways such as by specifying a LATA, a telephone area code (a "Numbering Plan Area or "NPA"), a telephone area code and a telephone prefix ("NPA NXX"), or a telephone area code and a telephone. Each such identifier is generically termed a "local calling area identifier" for purposes of this invention. In a preferred embodiment, a LATA is used.

Each Responsible Organization ("RespOrg") is assigned a five digit Responsible Organization ID ("RespOrg ID") that allows the RespOrg access to the SMS Database. A RespOrg is a private network provider or other telecommunications provider authorized to obtain 800 service numbers from the Service Management System. The RespOrg has responsibility for those numbers, which includes routing. Currently, there are approximately between 250 to 300 Resp Orgs.

In one embodiment, an Incumbent Local Exchange Carrier ("ILEC") receives the call from the SSP 212, which might or might not be colocated in the ILEC facility, and looks up the IntraLATA POTS telephone number. The ILEC routes the call onto an Intermachine Trunk ("IMT") serving the Competitive Local Exchange Carrier ("CLEC") 212 that is assigned to the IntraLATA POTS telephone number. An IMT is a high capacity communication channel that directly connects the switches of two LECs, such as an ILEC and a CLEC.

After receiving the call from the ILEC, the CLEC looks up where to route the call 214, which is to the private network provider's interconnection point, an Ingress Private Gateway ("IPG") to the private network. The call signal is routed via Bellcore Feature Group A or D or by Primary Rate Interface ("PRI") facilities to the CLEC that owns the IntraLATA POTS telephone number. Using PRI facilities to connect to a CLEC is the preferred embodiment.

In another embodiment of the invention, the CLEC could instead be an ILEC.

PRI is a standard high-speed data communications interface that is used in the Integrated Services Digital Network ("ISDN") system. This interface provides standard data rates for T1 at 1.544 Mbps and E1 at 2.048 Mbps. The interface can be divided into combinations of 384 kbps (H) channels, 64 kbps (B) channels and includes at least one 64 kbps (D) control channel. ISDN is a structured all digital telephone network system that was developed to replace (upgrade) existing analog telephone networks.

The IPG looks up the IntraLATA POTS telephone number in its private database and translates it to the originally dialed TF number 216. The switch in the IPG builds the associated DNIS data 216 in the telephony call header, which may contain the originally dialed TF telephone number. The IPG then routes the call and sends the associated DNIS data over a private network to an Egress Private Gateway ("EPG") 218.

The EPG routes the call through a recipient local telephone switch, which for purposes of this invention is defined as a dedicated connection to a facilities-based carrier 219, a dedicated connection to the actual called party, or routing the call through a switched connection to an egress SSP or local CO 220. The call may be routed through one or more intermediary switches before it reaches the recipient telephony device. The recipient telephony device, which may be a desk telephone or a cell phone, receives the telephone call 222.

One advantage of this invention over the prior art is that prior to the invention, a private carrier would need to provision a circuit to the ILEC where the call originates, which can be costly. In this invention, the call is routed to a CLEC where interconnection to a private carrier is cheaper. Another advantage of this invention over the prior art is that a private carrier only needs a single build-out per LATA to a CLEC provider. Prior to the invention, a private carrier might need to build out circuits to all of an ILEC's Access Tandems and/or Central Offices within an LATA. By virtue of only needing to provision to a CLEC per LATA, a private carrier saves provisioning time and administrative overhead. This invention additionally lowers the barriers of entry for competitive providers into the toll free arena. As opposed to the prior art, a competitive provider no longer needs to obtain an assigned CIC code because a generic CIC code can be used.

Figure 3:
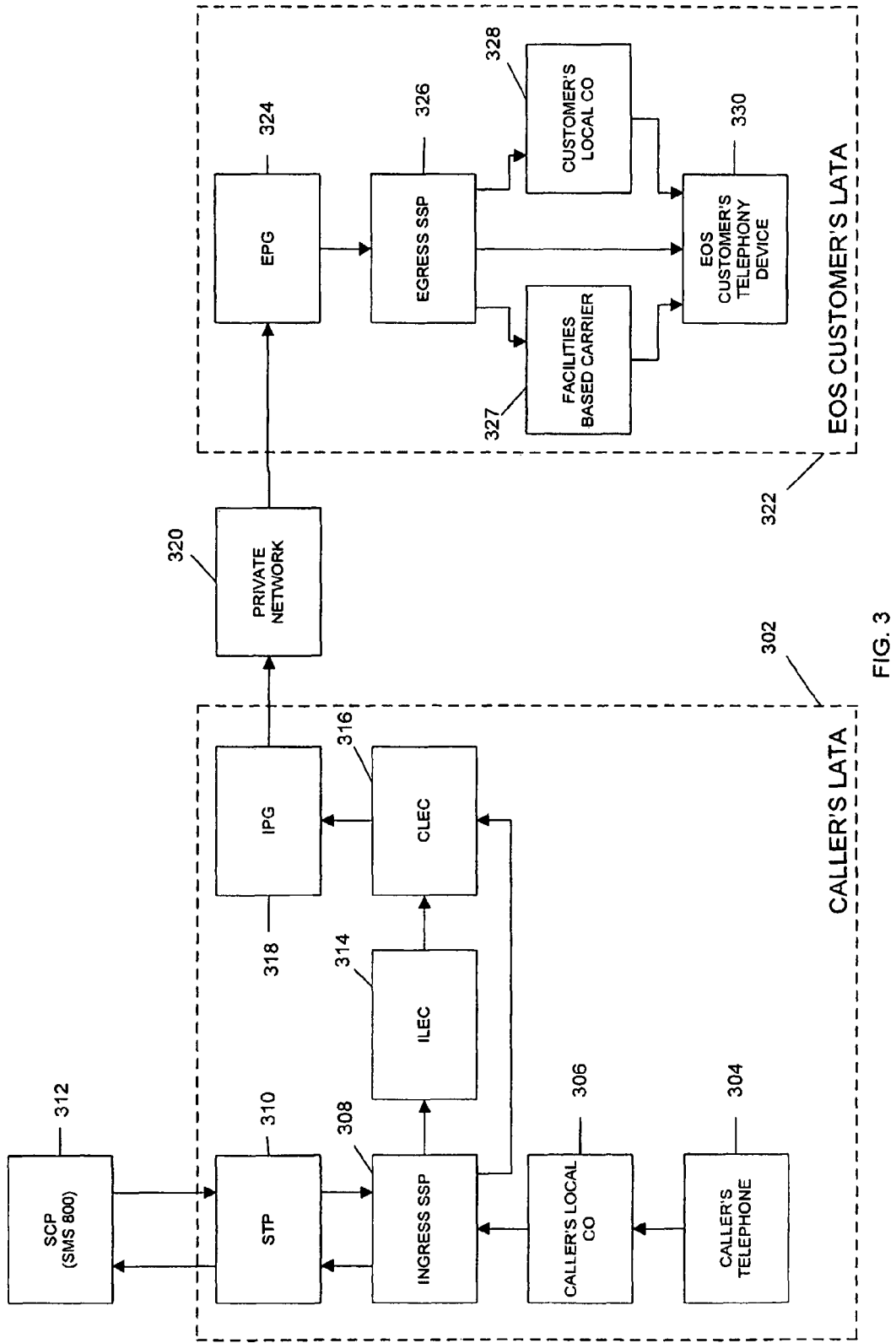
FIG. 3 shows a schematic block diagram of the system of enhanced origination services for toll free telephone service of the present invention.

FIG. 3 shows a schematic block diagram of the system of EOS for TF telephone calls of the present invention. Referring now to FIG. 3, a single toll free call is traced from start to finish. One skilled in the art will recognize that multiple toll free calls from multiple locations may be processed simultaneously with the present invention.

Parts of the components of the EOS System for TF telephone calls are located within Caller's LATA 302. In order to place a toll free telephony call, a caller from Caller's Telephone 304, which may be any number of different callers calling from any number of different telephones, dials a toll free telephone number. The call from Caller's Telephone 304 travels as a call signal to Caller's Local CO 306. Caller's Local CO 306 routes the call signal to Ingress SSP 308. The Local CO and SSP may be owned and/or operated by an ILEC or CLEC. Ingress SSP 308, via STP 310, queries SCP 312, which may or may not be located outside of Caller's LATA 302. SCP 312 accesses the SMS/800 National Database and returns to Ingress SSP 308 via STP 310 the TF routing information, which includes a CIC and IntraLATA POTS telephone number. Ingress SSP 308 next sends the call signal to the ILEC 314 or CLEC 316 that owns the POTS telephone number.

ILEC 314 or CLEC 316 receives the call signal, looks up the IntraLATA POTS telephone number in order to identify the CLEC or ILEC controlling the number. If the telephone number is owned by a CLEC, the ILEC routes the call signal onto the IMT serving that CLEC 316. After receiving the call signal, CLEC 316 looks up where to route the call signal, which is to IPG 318. On the other hand, if the POTS telephone number is owned by the ILEC, the ILEC looks up where to route the call signal, which is to IPG 318. IPG 318 looks up at least one private routing datum, the IntraLATA POTS telephone number, in a private regional database and translates it to the dialed TF number. The switch in IPG 318 builds the DNIS data, which may contain the originally dialed TF number. IPG then sends the call signal over Private Network 320. In one embodiment of the invention, which is the preferred embodiment, Private Network 320 is a packet-switched fiber optic private network that utilizes Internet Protocol for transporting voice, data, and video telephony, referred to as Voice Over Internet Protocol ("VoIP"), which is described in pending patent application Ser. No. 09/589,258 filed on Jun. 7, 2000 and entitled "Method and System for Transporting Voice, Data, and Video Telephony" which is herein incorporated by reference for all that is taught and disclosed therein.

Private Network 320 routes the call signal to EPG 324 within EOS Customer LATA 322. EPG 324 routes the call signal to Egress SSP 326, which routes the call signal to Customer's Local CO 328 or over the dedicated connection to a facilities-based carrier 327 or the actual called party 330. Customer's Local CO 328 or the facilities-based carrier 327 then delivers the call signal to EOS customer's telephony device 330.

Having described the present invention, it will be understood by those skilled in the art that many changes in construction and circuitry and widely differing embodiments and applications of the invention will suggest themselves without departing from the scope of the present invention.

What is claimed is:

1. An apparatus for sending a toll free message, said apparatus comprising:
    a private network;
    an ingress private gateway which interfaces to said private network;
    a private regional database containing at least one private routine datum where said private regional database interfaces with said ingress private gateway;
    a local telephone switch that interfaces with said ingress private gateway;
    a national toll free database that interfaces with said local telephone switch;
    an originating telephony device that interfaces with said local telephone switch;
    an egress private gateway which interfaces to said private network; and
    a recipient telephony device which interfaces to said egress private gateway;
    wherein a toll free telephony call initiated from said originating telephony device travels to said local telephone switch that accesses said national toll free database that instructs said local telephone switch to route said toll free telephony call to said ingress private gateway that accesses said private regional database containing said at least one private routing datum and sends said toll free telephony call over said private network and said egress private gateway to said recipient telephony device.

2. An apparatus for sending a toll free telephony message, said apparatus comprising:
    an electronic means to send a toll free telephony call from an originating telephony device to a local telephone switch;
    an electronic means to access a national toll free database containing at least one routing datum from said local telephone switch;
    an electronic means to send said toll free telephony call from said local telephone switch to an ingress private gateway to a private network;
    an electronic means for said ingress private gateway to access a private regional database;
    an electronic means for said ingress private gateway to update a telephony call header;
    an electronic means to send said toll free telephony call from said ingress private gateway over said private network to an egress private gateway connected to said private network; and
    an electronic means to send said toll free telephony call from said egress private gateway to a recipient telephony device;
    wherein said toll free telephony call is initiated from said originating telephony device and routed to said recipient telephony device via said local telephone switch that accesses said national toll free database containing at least one routing datum and said local telephone switch routes said toll free telephony call to said ingress private gateway that accesses said private regional database, updates said telephony call header, and sends said toll free telephony call over said private network to said egress private gateway, which then sends said toll free telephony call to said recipient telephony device.

* * * * *